(12) United States Patent
Schneider et al.

(10) Patent No.: US 10,899,648 B2
(45) Date of Patent: Jan. 26, 2021

(54) ION-CONDUCTING GLASS CERAMIC HAVING GARNET-LIKE CRYSTAL STRUCTURE

(71) Applicant: SCHOTT AG, Mainz (DE)

(72) Inventors: Meike Schneider, Taunusstein (DE); Oliver Hochrein, Mainz (DE); Wolfgang Schmidbauer, Mainz (DE); Miriam Kunze, Saulheim (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 16/596,588

(22) Filed: Oct. 8, 2019

(65) Prior Publication Data

US 2020/0144660 A1  May 7, 2020

Related U.S. Application Data

(60) Division of application No. 15/215,421, filed on Jul. 20, 2016, now Pat. No. 10,483,585, which is a (Continued)

(30) Foreign Application Priority Data

Jan. 22, 2014 (DE) .......... 10 2014 100 684

(51) Int. Cl.
*C03B 5/02* (2006.01)
*C03C 3/12* (2006.01)
(Continued)

(52) U.S. Cl.
CPC .......... *C03B 5/021* (2013.01); *C03C 3/12* (2013.01); *C03C 3/125* (2013.01); *C03C 4/18* (2013.01);
(Continued)

(58) Field of Classification Search
CPC .......... H01M 10/562; H01M 10/052; H01M 10/0525; H01M 2300/002;
(Continued)

(56) References Cited

U.S. PATENT DOCUMENTS 6,226,308 B1  5/2001  Samson
6,485,622 B1  11/2002  Fu
(Continued)

FOREIGN PATENT DOCUMENTS

CN  101174698  5/2008
CN  102308425  1/2012
(Continued)

OTHER PUBLICATIONS

Awaka et al.; "Synthesis and structure analysis of tetragonal Li7La3Zr2O12 with the garnet-related type structure", Journal of Solid State Chemistry 182, 2009, pp. 2046-2052.
(Continued)

*Primary Examiner* — Amanda C. Walke
(74) *Attorney, Agent, or Firm* — Ohlandt, Greeley, Ruggiero & Perle, L.L.P.

(57) ABSTRACT

A glass ceramic containing lithium-ions and having a garnet-like main crystal phase having an amorphous proportion of at least 5% is disclosed. The garnet-like main crystal phase preferably has the chemical formula $Li_{7+x-y}M_x^{II}M_{3-x}^{III}M_{2-y}^{IV}M_y^{V}O_{12}$, wherein $M^{II}$ is a bivalent cation, $M^{III}$ is a trivalent cation, $M^{IV}$ is a tetravalent cation, $M^V$ is a pentavalent cation. The glass ceramic is prepared by a melting technology preferably within a Skull crucible and has an ion conductivity of at least $5 \cdot 10^{-5}$ S/cm, preferably of at least $1 \cdot 10^{-4}$ S/cm.

20 Claims, 2 Drawing Sheets

Related U.S. Application Data continuation of application No. PCT/EP2015/050889, filed on Jan. 19, 2015.

(51) Int. Cl.

| | | |
|---|---|---|
| *C03C 4/18* | (2006.01) | |
| *C03C 10/00* | (2006.01) | |
| *H01M 10/052* | (2010.01) | |
| *H01M 10/0562* | (2010.01) | |
| *C03C 21/00* | (2006.01) | |
| *H01M 10/0525* | (2010.01) | |

(52) U.S. Cl.
CPC ............ *C03C 10/00* (2013.01); *C03C 21/002* (2013.01); *H01M 10/052* (2013.01); *H01M 10/0525* (2013.01); *H01M 10/0562* (2013.01); *C03C 2204/00* (2013.01); *H01M 2300/002* (2013.01); *H01M 2300/0071* (2013.01); *H01M 2300/0074* (2013.01); *H01M 2300/0077* (2013.01)

(58) Field of Classification Search
CPC . H01M 10/0074; H01M 10/0077; C03C 3/12; C03C 3/125; C03C 4/18
See application file for complete search history.

(56) References Cited

U.S. PATENT DOCUMENTS

| | | |
|---|---|---|
| 6,817,212 B1 | 11/2004 | Roemer |
| 9,966,630 B2 | 5/2018 | Cheng |
| 2004/0142244 A1 | 7/2004 | Visco |
| 2004/0196887 A1 | 10/2004 | Schmidbauer |
| 2005/0107239 A1 | 5/2005 | Akiba |
| 2008/0220334 A1 | 9/2008 | Inda |
| 2009/0159839 A1 | 6/2009 | Seino |
| 2010/0047696 A1 | 2/2010 | Yoshida |
| 2010/0167091 A1 | 7/2010 | Tachiwana |
| 2011/0053001 A1 | 3/2011 | Babic |
| 2011/0244337 A1 | 10/2011 | Ohta |
| 2012/0196189 A1 | 8/2012 | Babic |
| 2012/0308900 A1 | 12/2012 | Ogasa |
| 2014/0057162 A1 | 2/2014 | Schneider |
| 2014/0205910 A1 | 7/2014 | Weppner |
| 2014/0356736 A1 | 12/2014 | Choi |
| 2015/0200420 A1 | 7/2015 | Holme |
| 2015/0333307 A1 | 11/2015 | Thokchom |
| 2016/0190640 A1 | 6/2016 | Visco |
| 2016/0351889 A1 | 12/2016 | Swonger |
| 2018/0351889 A1 | 12/2018 | Keating |

FOREIGN PATENT DOCUMENTS

| | | |
|---|---|---|
| CN | 103402939 | 11/2013 |
| DE | 19939780 | 2/2001 |
| DE | 19939782 | 5/2001 |
| DE | 102007030604 | 1/2009 |
| DE | 102012207424 | 6/2013 |
| EP | 1673818 | 12/2009 |
| EP | 2159867 | 3/2010 |
| EP | 2683005 | 1/2014 |
| JP | H11511591 | 10/1999 |
| JP | 2012068073 | 4/2012 |
| JP | 2012243743 | 12/2012 |
| JP | 2012246196 | 12/2012 |
| JP | 2013184848 | 9/2013 |
| JP | 2015138741 | 7/2015 |
| JP | 2017183115 | 10/2017 |
| KR | 20160124240 | 10/2016 |
| KR | 101709203 | 2/2017 |
| WO | 2005085138 | 9/2005 |
| WO | 2013012391 | 1/2013 |
| WO | 2013164116 | 11/2013 |

OTHER PUBLICATIONS

Knauth, Philippe; "Inorganic solid Li ion conductors: An overview"; Solid State Ionics, 180, 2009, pp. 911-916.

English translation of International Search Report dated Apr. 21, 2015 for corresponding International Application No. PCT/EP2015/050889, 2 pages.

English translation of Written Opinion dated Apr. 21, 2015 for corresponding International Application No. PCT/EP2015/050889, 6 pages.

English translation of International Preliminary Report on Patentability dated Jul. 26, 2016 for corresponding ntemational Application No. PCT/EP2015/050889, 7 pages.

ION-CONDUCTING GLASS CERAMIC HAVING GARNET-LIKE CRYSTAL STRUCTURE

CROSS REFERENCE TO RELATED APPLICATIONS

This application is a division of U.S. application Ser. No. 15/215,421 filed on Jul. 20, 2016, which is a continuation of International Application PCT/EP2015/050889 filed on Jan. 19, 2015, which claims priority from German Application 10 2014 100 684.4 filed on Jan. 22, 2014, the entire contents of all of which are incorporated herein by reference.

BACKGROUND

1. Field of the Invention

The invention relates to an electrolyte or an electrolyte additive which in particular can be used in lithium-ion batteries or other battery designs, such as lithium-air batteries or lithium-sulfur batteries.

2. Description of Related Art

Lithium-ion batteries and future battery designs, such as lithium-air batteries or lithium-sulfur batteries apart from a high energy density must fulfill also high demands with respect to safety and reliability which must be ensured for the total life-time. In this regard liquid electrolytes in the past often have emerged negatively, since they have the tendency to dissolve which may lead to a loss in conductivity and/or to undesired disintegration products, and since they are easily flammable.

An alternative are polymeric electrolytes which however have only small ionic conductivities. By contrast, gel-electrolytes, which are a combination of liquid and polymeric electrolytes, often have better conductivities, however have the tendency to be flammable.

Due to this reason it has been tried for a long time to develop solid electrolytes as an alternative. With respect to solid electrolytes an ionic conductivity of at least $10^{-5}$ S/cm, better at least $10^{-4}$ S/cm is demanded. At the same time the electronic conductivity should be lower by at least 4 to 5 magnitudes to avoid a self-discharging of the battery. In addition the chemical resistance against all materials used in the battery is expected, in particular against metallic lithium. Of course, also a sufficient electrochemical stability during charging and discharging (cycling) of the battery should be present.

Such demands are fulfilled only by few known materials. These include on the one hand sulfidic systems with the main components lithium, phosphorus and sulfur, and on the other hand oxidic systems with NaSiCon or garnet-like crystal phases.

Sulfidic compositions such as Li—S—P, $Li_2S$—$B_2S_3$—$LI_4SiO_4$ or $Li_2S$—$P_2S_5$—$P_2O_5Li$—S—P, and $Li_2S$—$P_2S_5$—$P_2O_5$ often are prepared by grinding the starting ingredients under protective gas and by a subsequent temperature treatment (usually also under protective gas) (confer to this end US 2005/0107239 A1, US 2009/0159839 A1). Partially ionic conductivities of more than $10^{-3}$ S/cm are reported at room temperature.

However, the large-scale production of such materials is complicated, since it must be performed in the absence of air, since the materials are not stable under air. In particular, the presence of only small amounts of water has been found to lead to a fast disintegration. This leads to an increase of the production and processing cost and poses a safety-technical problem.

Also with oxidic systems with NaSiCon conductivities of more than $10^{-4}$ S/cm can be reached at room temperature.

However, the NaSiCon materials usually are not stable against metallic lithium which requires the utilization of an additional protective layer for protecting the anode (confer EP 1673818 B1). In addition for high conductivities often the use of costly row materials, such as germanium, tantalum or gallium is required.

An alternative are systems with garnet-like crystal phases, such as $Li_7La_3Zr_2O_{12}$ (US 2010/0047696 A1). From DE 10 2007 030604 A1 and from WO 2005/085138 A1 garnet-like crystal phases ($Li_{7+x}A_xG_{3-x}Zr_2O_{12}$ (with A: bivalent cation, G: trivalent cation) or $Li_{5+x}A_xG_{3-x}M_2O_{12}$ (with A: bivalent cation, G: trivalent cation, M: pentavalent cation) are known. In the pure system $Li_7La_3Zr_2O_{12}$ at about 150 to 200° C. a reversible phase transition occurs from the tetragonal garnet phase, which is stable at room temperature, to the cubic garnet phase. The tetragonal garnet phase offers a lithium-ion conductivity of about $1.6 \times 10^{-6}$ S/cm (confer J. Akawa et al., Journal of Solid State Chemistry 182 (2009), 2046-2052). The cubic phase which can be stabilized by means of dopings, such as with aluminum or tantalum also at room temperature, even shows a conductivity in the order of $10^{-4}$ S/cm (confer EP 2 159 867 A1).

Materials with lithium-garnet-like crystal phases usually are prepared by means of a solid body sintering route which often requires several grinding and several temperature treatment operations (confer EP 2 159 867 A1).

A problem with this production are the high temperatures up to about 1250° C. that are necessary for generating the desired crystal phases which at the same time lead to a strong lithium evaporation. The use of a too high lithium proportion leads to a stabilization of the tetragonal phase having poorer conductivity, while a lithium proportion that is too small leads to the generation of foreign phases. This complicates the preparation of highly conductive pure phase material on an industrial scale.

From DE 10 2012 207 424 B3 an ion-conducting, alkaline containing glass ceramic is known wherein after a ceramizing of the glass ceramic from a starting glass at least a part of the alkali-ions of the glass ceramic are exchanged against alkali-ions of a different, preferably smaller, atomic number. The glass ceramic comprises nepheline or carnegeit as main crystal phases and before the alkali-ion-exchange comprises at least the following components: 15-75 wt.-% $SiO_2$, 4-60 wt.-% $Al_2O_3$, 4-65 wt.-% $Na_2O$, 0-10 wt.-% $Li_2O$, 0-10 wt.-% $TiO_2$, 0-10 wt.-% $ZrO_2$, 0-5 wt.-% $SnO_2$, 0-20 wt.-% $B_2O_3$, 0-30 wt. % $P_2O_5$. The glass ceramics are molten within a platinum-rhodium crucible by melting the starting materials at 1600 to 1650° C., refining and stirring, thereafter casting, and are then controlled transferred into a glass ceramic according to a ceramization program. The glass ceramic comprises nepheline ($NaAlSiO_4$) as a dominating phase and as side phases depending on the composition $Na_2TiSiO_5$, $Li_2SiO_3$, $Li_2TiO_3$. In a $LiNO_3$ bath (6 hours at 340° C.) the sodium almost fully is exchanged against lithium. The lithium-ion conductivity is in the range of about $10^{-4}$ S/cm. The key part of such a glass ceramic shall be crystal phases of one or more crystal types within which alkali-ions can move relatively free on percolating paths, partially in veritable channel structures within a generated network within fixed bindings of mostly covalent character. It should be noted that such networks in particular can be designed using polyvalent cations, in particular trivalent to pentavalent cations with connecting oxygen atoms. Such crystal types shall be found in many crystal systems, such as in the perovskite-type lithium-lanthanum-titanate $La_{(2/3-x)}Li_{3x}TiO_3$, sodiumbeta-aluminate $NaAl_{11}O_{17}$, borates, phosphates, chain, band, layer and framework silicates. In this context also the garnet-like $Li_5La_3(Nb, Ta)_2O_{12}$ is mentioned (confer Philippe Knauth: Inorganic solid Li ion conductors: An overview, Solid State Ionics 180 (2009) 911-916). However, with respect to the preparation nothing is disclosed in this regard.

SUMMARY

In view of this it is a first object of the invention to disclose a material which is suitable as a solid-state electrolyte or as an electrolyte additive within a lithium-ion battery, an all-solid-state battery, a lithium-air battery, a lithium-sulfur battery, or another battery.

It is a second object of the invention to disclose a method of producing such a material on a technological scale in a simple and cost-effective way.

It is a third object of the invention to disclosed an improved battery having longer service life or increased capacity.

According one aspect of the invention this object is solved by a lithium-ion conducting glass ceramic with garnet-like main crystal phase having an amorphous proportion of at least 5 wt.-%, preferably at least 10 wt.-%.

The object of the invention is fully solved in this way.

According to the present invention a glass ceramic is understood as a material that is prepared on a melting technological route that has been transferred into a glass ceramic by a subsequent specific temperature treatment.

The glass ceramic according to the invention comprises an amorphous proportion of at least 5 wt.-%. The conductivity is positively influenced by the amorphous proportion. However, the proportion of the amorphous phase should be no larger than 40 wt.-%, preferably smaller or equal to 30 wt.-%, since otherwise the total conductivity is reduced.

A further advantage in the preparation of the glass ceramic rests in the possibility that the structure can be directly influenced by a specific crystallization, whereby the conductivity can further be influenced positively.

The glass ceramic according to the invention preferably has an ion-conductivity of at least $5 \cdot 10^{-5}$ S/cm, preferably of at least $1 \cdot 10^{-4}$ S/cm. Partially the ion-conductivity can be considerably higher.

The glass ceramic according to the invention comprises a garnet-like main crystal phase, preferably according to the chemical formula: $Li_{7+x-y}M^{II}_xM^{III}_{3-x}M^{IV}_{2-y}M^{V}_yO_{12}$, wherein $M^{II}$ is a bivalent cation, $M^{III}$ is a trivalent cation, $M^{IV}$ is a tetravalent cation, $M^V$ is a pentavalent cation, wherein preferably $0 \leq x < 3$, further preferred $0 \leq x \leq 2$, $0 \leq y < 2$, and particularly preferred $0 \leq y \leq 1$.

The glass ceramic for instance comprises preferably the oxides of lithium, lanthanum and zirconium, as well as further doping materials that make possible the stabilization of the cubic garnet phase at room temperature and that positively influence further characteristics, such as the meltability, the processing or the electrochemical characteristics, as desired.

As far as within this application compositions are given in the form that particular components are present therein or that they comprise particular components, these are always to be understood so that any additional components may be contained therein (open composition).

In a further configuration of the invention the given compositions however are also be understood so that the respective components given are contained therein (closed composition) apart from unavoidable contaminations that are due to the nature of the glass manufacture. Depending on the purity of the raw materials that are used, such unavoidable contaminations are limited to a maximum of 1 wt.-%, preferably of 0.5 wt.-%, further preferred to 0.1 wt.-%, or even to 0.05 wt.-%.

As far as in this application compositions are given in the form that they consist of particular components, then these compositions are always to be understood that only the given components are contained therein (closed composition), however with the proviso that unavoidable contaminations that are due to the nature of the glass manufacture, may be contained therein. Depending on the purity of the used raw materials, such unavoidable contaminations are limited to a maximum of 1 wt.-%, preferably of 0.5 wt.-%, more preferred of 0.1 wt.-%, or even of 0.05 wt.-%.

As far as within this application compositions are given in examples by listing particular components, these statements are to be understood as closed compositions, however with the proviso that unavoidable contaminations that are due to the nature of the glass manufacture, may be contained therein. Depending on the purity of the used raw materials such unavoidable contaminations are limited to a maximum of 1 wt.-%, preferably of 0.5 wt.-%, further preferred of 0.1 wt.-%, or even of 0.05 wt.-%.

Preferably the glass ceramic comprises 10-25 wt.-% $Li_2O$, particularly preferred 10-20 wt.-% $Li_2O$.

Further preferred the glass ceramic comprises 40-60 wt.-%, particularly preferred 50-60 wt.-% of an oxide of at least one lanthanoid, preferably $La_2O_3$.

According to a further development of the invention the glass ceramic comprises 15-35 wt.-%, preferably 15-30 wt.-%, further preferred 20-30 wt.-% of $ZrO_2$.

With these raw materials the desired main crystal phase can be realized in a particularly simple and cost-effective way.

By the addition of further doping materials according to the above-given chemical formula in addition specific mixed crystal main phases can be produced, whereby the conductivity can be further optimized.

The glass ceramic according to a further development of the invention preferably comprises 0-10 wt.-%, further preferred 0-5 wt.-%, further preferred 1-5 wt.-% of an oxide selected from the group consisting of $Al_2O_3$, $Bi_2O_3$, $Ga_2O_3$, $Y_2O_3$, $Fe_2O_3$, $Cr_2O_3$, $In_2O_3$, and mixtures thereof.

According to a further development of the invention the glass ceramic preferably comprises 0-20 wt.-%, further preferred 1-20 wt.-%, further preferred 0-13 wt.-%, further preferred 1-13 wt.-%, particularly preferred 5-13 wt.-% of an oxide selected from the group consisting of $Ta_2O_5$, $Nb_2O_5$, $V_2O_5$, $P_2O_5$ and mixtures thereof.

According to a further development of the invention the glass ceramic preferably comprises 0-10 wt.-%, further preferred 0-5 wt.-%, particularly preferred 1-5 wt.-% of an oxide selected from the group consisting of $TiO_2$, $HfO_2$, $SnO_2$, and mixtures thereof.

According to a further development of the invention the glass ceramic preferably comprises 0-10 wt.-%, further preferred 1-10 wt.-%, at least of an oxide selected from the group consisting of RO, ZnO and mixtures thereof, wherein R is an alkaline earth ion.

By these additions the desired characteristics can be further positively influenced, that is in particular the conductivity can be increased, the chemical stability against the materials used within the battery can be positively influenced, and partially also the production during melting is simplified. In addition, a sufficient electrochemical stability during cycling of the battery can be positively influenced.

The glass ceramic according to the invention preferably is used as an electrolyte or an electrolyte additive within a lithium-ion battery, an all-solid-state battery, a lithium-air battery or a lithium-sulfur battery.

Also the application of the glass ceramic as an electrode additive in such a battery is conceivable.

All known integration forms are possible, such as a thin layer or membrane, as single electrolyte or as a component of the electrolyte together with a different material. For preparing such a layer or membrane apart from the shaping possibilities of a glass (melting, tearing, rolling etc.) also techniques such as screen printing, foil casting or coating techniques may be utilized.

Also a utilization as a coating on an electrode is possible, such as a component of a composite electrolyte, preferably of a polymeric solid-state membrane. The glass ceramic may also be used as a component of a coating, wherein the glass ceramic preferably represents 50 to 100 vol.-%, further preferred 70 to 95 vol.-%, particularly preferred 80 to 90 vol.-% of the coating.

A glass ceramic according to the invention can be prepared by melting and homogenizing of the starting materials and by a cooling of the melt (preferably after a casting), by direct solidification or by a controlled cooling, or after quenching, followed by a temperature treatment (ceramization treatment) into a glass ceramic material with garnet-like main crystal phase.

Preferably, the melting and homogenizing is performed within an inductively heated Skull crucible.

Since lithium-containing glass melts are very aggressive, a melting within a platinum or platinum-rhodium crucible may at most be performed on a laboratory scale. A melting within a platinum crucible leads to an attack onto the crucible material and to detectable fractions of the noble material within the produced product. This again leads to a considerable increase in electronic conductivity which has a detrimental effect.

A further possibility for the production by melting technology is the utilization of a glass-carbon crucible. However, since these crucibles at the necessary high temperature are oxidized under oxygen-containing atmosphere, the production must be performed under protective atmosphere (nitrogen or argon). These production method is thus suitable for smaller lots, however is detrimental for a large-scale production, since linked to additional cost.

The melting and homogenizing within an inductively heated Skull crucible is thus a preferred production method, whereby the afore-mentioned disadvantages are avoided.

With respect to the details of the melting within the Skull crucible reference is made to DE 199 39 780 A1 and DE 199 39 782 C1 which are fully incorporated herein by reference.

Preferably, herein a Skull crucible is used which is made of a plurality of metal tubes which are traversed by a coolant having slot-like intervals between the metal tubes, and further having an induction coil surrounding the metal tubes from the outside, wherein the metal tubes preferably are shortened with each other.

It will be understood that the afore-mentioned features and to be described hereinafter cannot only be used in the respectively given combination, but also in different combinations or independently, without leaving the scope of the present invention.

BRIEF DESCRIPTION OF THE DRAWINGS

Further features and advantages of the invention can be taken from the subsequent description of preferred embodiments with reference to the drawings. In the drawings show.

DETAILED DESCRIPTION

Examples

Figure 1:
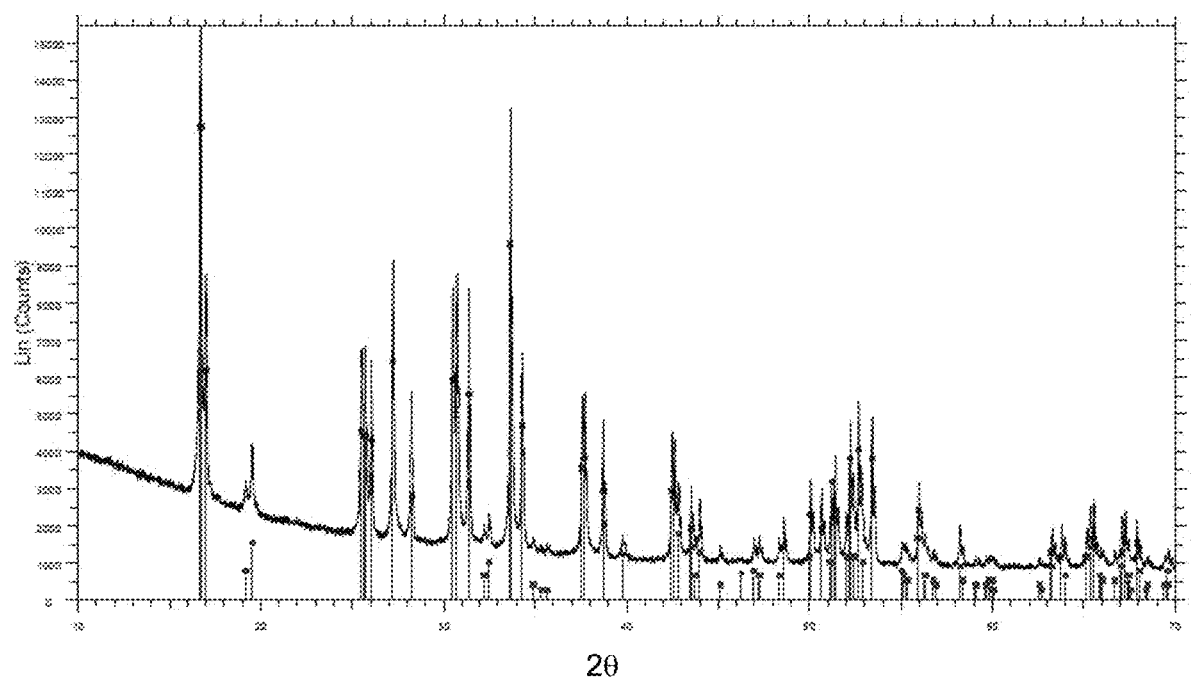
FIG. 1 is an X-ray diffraction diagram of a glass ceramic prepared within a platinum crucible by melting, comprising tetragonal LLZO ($Li_7La_3Zr_2O_{12}$) as a main phase and small amounts of elementary Pt as a side phase.

A glass ceramic according to the invention preferably has the garnet-like main crystal phase according to the chemical formula:

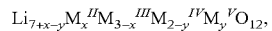

$$Li_{7+x-y}M^{II}_xM^{III}_{3-x}M^{IV}_{2-y}M^{V}_yO_{12},$$

wherein $M^{II}$ is a bivalent cation, $M^{III}$ a trivalent cation, $M^{IV}$ a tetravalent cation, $M^{V}$ a pentavalent cation, wherein preferably $0 \leq x < 3$, more preferred $0 \leq x \leq 2$, $0 \leq y < 2$, and particularly preferred $0 \leq y \leq 1$.

TABLE 1 shows different compositions (in wt. -% on oxide basis) which were used for preparing a glass ceramic according to the invention; the specifics with respect to the proportions of cubic, tetragonal, and amorphous phase are given in vol.-%.

| Example | 1 | 2 | 3 | 4 | 5 | 6 | 7 | 8 | 9 |
|---|---|---|---|---|---|---|---|---|---|
| $Li_2O$ | 14.02 | 14-16 | 14.31 | 13.87 | 14.32 | 12.86 | 13.23 | 13.94 | 14.65 |
| $La_2O_3$ | 55.24 | 55.15 | 55.06 | 55.34 | 55.12 | 56.07 | 55.83 | 53.64 | 56.37 |
| $ZrO_2$ | 27.86 | 27.81 | 27.76 | 27.90 | 24.32 | 24.74 | 24.63 | 20.29 | 21.32 |
| $Al_2O_3$ | 2.88 | 2.88 | 2.87 | 2.89 | | | | | |
| $Ta_2O_5$ | | | | | 6.23 | 6.34 | 6.31 | 12.13 | |
| $Nb_2O_5$ | | | | | | | | | 7.66 |
| Cubic phase | 62% | 55% | 40% | 38% | 27% | 49% | 75% | 100% | 100% |
| Tetragonal Phase | 38% | 45% | 60% | 62% | 73% | 51% | 25% | | |

TABLE 1-continued shows different compositions (in wt. -% on oxide basis) which were used for preparing a glass ceramic according to the invention; the specifics with respect to the proportions of cubic, tetragonal, and amorphous phase are given in vol.-%.

| Example | 1 | 2 | 3 | 4 | 5 | 6 | 7 | 8 | 9 |
|---|---|---|---|---|---|---|---|---|---|
| Foreign Phases | none | none | none | none | none | none | none | none | none |
| Amorphous Proportion | ca. 15% | ca. 10% | 16% | 21% | n.d. | n.d. | n.d. | n.d. | n.d. |
| Conductivity (S/cm) | $1 \cdot 10^{-4}$ | n.d. | $1 \cdot 10^{-4}$ | n.d. | $3 \cdot 10^{-4}$ | $2.9 \cdot 10^{-4}$ | $3 \cdot 10^{-4}$ | $5 \cdot 10^{-4}$ | $3 \cdot 10^{-4}$ | n.d.—not determined

The melting is performed within a so-called Skull crucible, such as described in DE 199 39 782 C1.

In the Skull technology a water-cooled crucible is utilized, within which during the melting a cooler protective layer forms from the molten material. Thus, during the melting procedure no crucible material is dissolved. The energy introduction into the melt is realized by coupling using high frequency coupling via the surrounding induction coil into the liquid material. A condition in this regard is a sufficient conductivity of the melt which in the case of lithium-garnet melts is ensured by the high lithium content. During the melting procedure there is a lithium evaporation which can easily be corrected by a lithium excess. To this end usually there is worked with a 1.1- to a 2-fold lithium excess.

The raw materials according to the composition given in TABLE 1 are mixed and then given into the Skull crucible that is open on the top side. The mixture had initially to be preheated to reach a certain minimum conductivity. To this end a burner heating was utilized. After reaching the coupling temperature the further heating and homogenizing of the melt was ensured by high frequency coupling via the induction coil.

To improve the homogenization of the melt, it was stirred using a water-cooled stirrer.

After full homogenization direct samples were taken from the melt (fast cooling), while the reminder of the melt was cooled slowly by switching off the high frequency.

The material prepared in this way may basically be either directly solidified from the melt or by quenching, followed by a temperature treatment (ceramizing) transferred into a glass ceramic material with garnet-like main crystal phase.

The samples taken from the melt independently from the cooling showed a spontaneous crystallization, so that a subsequent ceramization treatment could be dispensed with.

The measurement of the ion-conductivity showed the positive influence of the amorphous phase contained within the glass ceramic which can be explained by a reduction of the conductivity decrease by the grain boundaries.

From the glass ceramics obtained in this way samples for the impedance-spectroscopy were prepared for determining the conductivity, as well as for X-ray diffraction investigations (XRD). To avoid a degradation of the samples upon contact with water the sample preparation was performed water-free.

The X-ray diffraction investigations (XRD) in all samples showed a mixture of tetragonal and cubic crystal phases.

FIG. 1 shows a comparison of a tetragonal LLZO prepared within a platinum crucible by melting technology. Herein apart from the desired main phase (tetragonal LLZO ($Li_7La_3Zr_2O_{12}$)) as a side phase also reflexes of elementary platinum (main peak at 39.8°) can be seen. This is due to an attack onto the melting crucible by the highly lithium-containing melt. Due to this reason the later melting processes with the compositions given in TABLE 1 were performed within a Skull crucible as described above.

Figure 2:
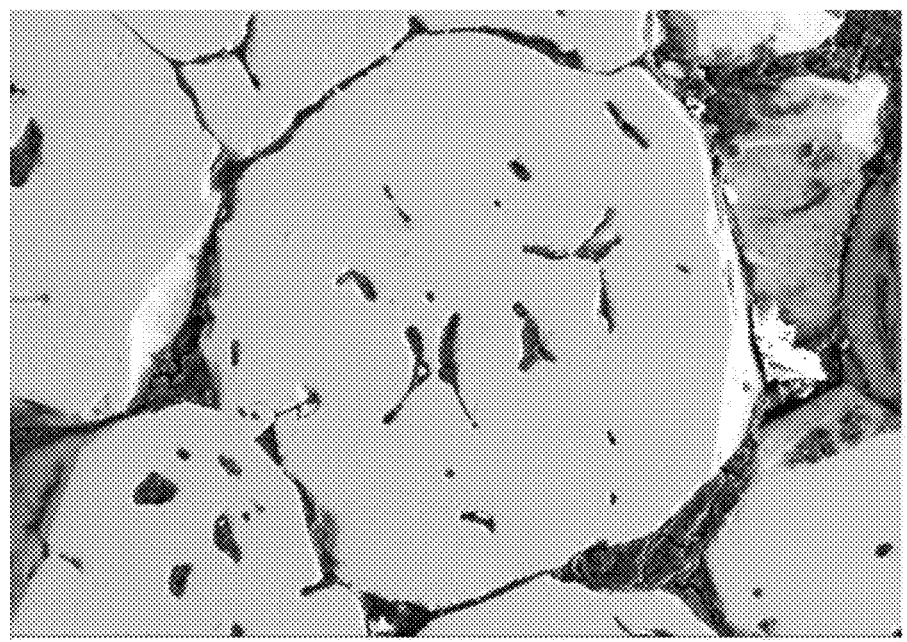
FIG. 2 a SEM picture of the LLZO prepared by melting.

FIG. 2 shows the LLZO prepared by melting within a Pt-crucible under the scanning electron microscope with structures of a size of up to 300 μm.

For a precise determining of the phase content a Rietveld-analysis was performed. According to TABLE 1 the samples that are doped with aluminum (no. 1-4) contain a fraction of cubic phase between 38 and 62%, while the samples that are doped with tantalum (nos. 5-8) contain a cubic fraction of 27 to 100% (each without taking into account the amorphous fraction). Also using a doping with niob makes possible a fully stabilization of the cubic phase (confer example 9).

Even in the samples with high tetragonal proportion there are considerably high conductivities. Thus example 3 that comprises 60% of tetragonal phase, the conductivity of which in literature is given with $1.6 \cdot 10^{-6}$ S/cm, shows a conductivity of about $1 \cdot 10^{-4}$ S/cm. This almost corresponds to the expected conductivity for aluminum-dopings of the pure cubic phase ($2 \cdot 10^{-4}$ S/cm).

A determination of the amorphous proportion using Rietveld-improvements, or using an external standard, respectively, with respect to the samples did not lead to correct results, due to the strong reflex superimpositions of the cubic and tetragonal LLZO phases. The determination of the amorphous proportion, or the crystallinity, respectively, therefore was made by evaluating the underground. Also measurements on fully crystalline samples show a noise which is due to crystal lattice flaws, the influence of optical devices, fluorescence effects and dispersive effects. If the sample is not fully crystalline, then to this noise the contribution of the amorphous phase is added. The constant noise therefore was determined using standard samples with defined amorphous proportions. In this way the determination of the amorphous proportion within the samples was made possible which is between 10 and 21% according to TABLE 1.

If the different conductivities of the cubic and tetragonal phases are taken into account, as well as the fact that in part considerable amounts of tetragonal phases are contained within the samples, then it can be derived that the amorphous phase contained within the glass ceramic increases the total conductivity which is a surprising result.

Figure 3:
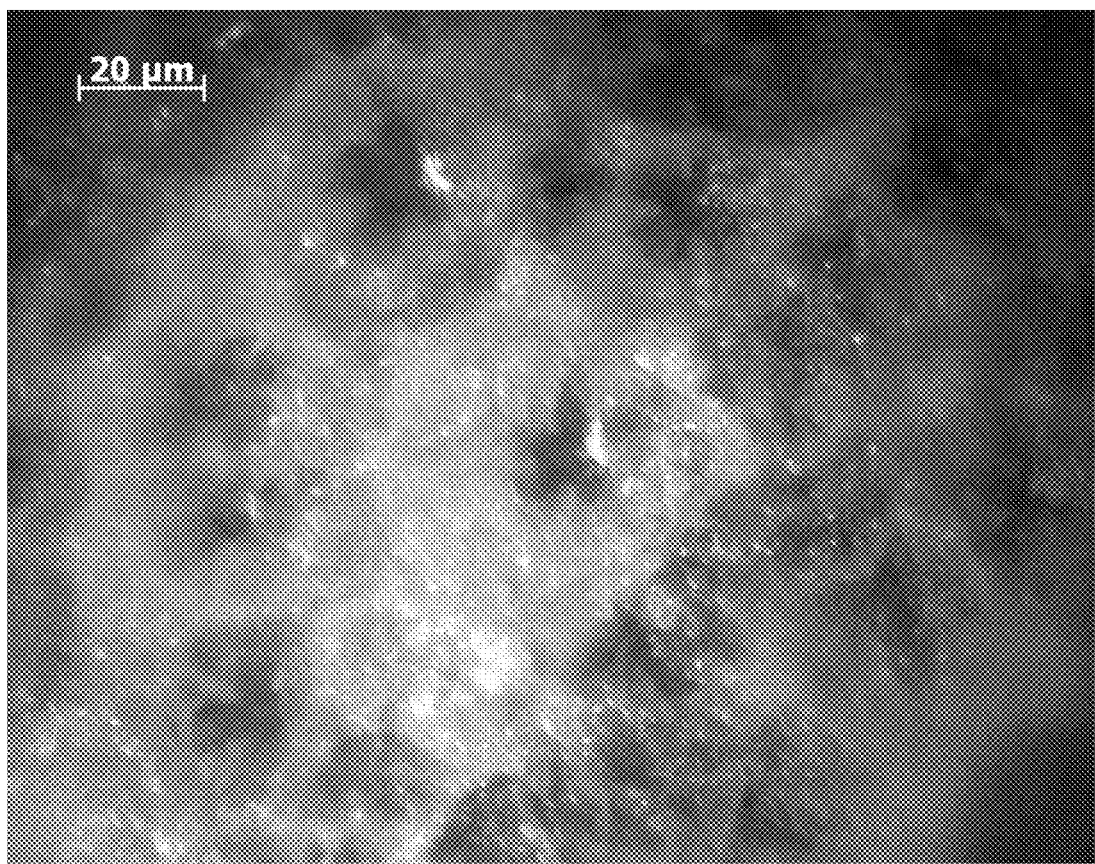
FIG. 3 a picture taken by polarization microscopy of a LLZO glass ceramic according to the invention which was molten within a Skull crucible, wherein the dark regions show the amorphous phase.

Since the determination of the amorphous proportion is done only indirectly, a sample (composition according to example 5) was examined using a polarization microscope. Herein dark regions are found within the sample which is evidence of an amorphous proportion. FIG. 3 shows a picture of a sample which, for increasing the visibility of the amorphous regions was transferred in water for 2-3 days. About 10 μm large amorphous structures can be clearly seen.

What is claimed is:

1. A method of producing a glass ceramic comprising a garnet-like main crystal phase, wherein the garnet-like main crystal phase has a chemical formula $Li_{7+x-y}M_x^{II}M_{3-x}^{III}M_{2-y}^{IV}M_y^{V}O_{12}$, wherein $M^{II}$ is a bivalent cation, $M^{III}$ is a trivalent cation, $M^{IV}$ is a tetravalent cation, $M^{V}$ is a pentavalent cation, wherein $0 \leq x < 3$ and $0 \leq y < 2$, the method comprising the steps of:
- providing starting materials for the glass ceramic;
- melting and homogenizing the starting materials in an inductively heated Skull crucible to yield a glass melt; and
- cooling the glass melt and temperature treating to generate the glass ceramic comprising the garnet-like main crystal phase with an amorphous proportion of at least 5% wt.-%.

2. The method of claim 1, wherein the inductively heated Skull crucible has a plurality of metal tubes that are traversed by a coolant having slot-like intervals between the plurality of metal tubes, and further comprise having an induction coil surrounding the plurality of metal tubes.

3. The method of claim 2, wherein the plurality of metal tubes are shorted with each other.

4. The method of claim 1, wherein the glass ceramic comprises 10-25 wt.-% of $Li_2O$.

5. The method of claim 1, wherein the glass ceramic comprises in total 40-60 wt.-% of an oxide of at least one lanthanoid.

6. The method of claim 1, wherein the glass ceramic comprises 10-25 wt.-% of $Li_2O$ and in total 40-60 wt.-% of an oxide of at least one lanthanoid.

7. The method of claim 1, wherein $0 \leq x \leq 2$ and $0 \leq y \leq 1$.

8. The method of claim 1, wherein the amorphous proportion has a maximum of 40 wt.-%.

9. The method of claim 1, wherein the glass ceramic has an ion-conductivity of at least $5 \cdot 10^{-5}$ S/cm.

10. The method of claim 1, wherein the glass ceramic comprises in total 40-60 wt.-% of $La_2O_3$.

11. The method of claim 1, wherein the glass ceramic comprises 15-35 wt.-% of $ZrO_2$.

12. The method of claim 1, wherein the glass ceramic comprises 1-5 wt.-% of one oxide being selected from a group consisting of $Al_2O_3$, $Bi_2O_3$, $Ga_2O_3$, $Y_2O_3$, $Fe_2O_3$, $Cr_2O_3$, $In_2O_3$, and mixtures thereof.

13. The method of claim 12, wherein the glass ceramic comprises 1-5 wt.-% of one oxide being selected from a group consisting of $Al_2O_3$, $Bi_2O_3$, $Ga_2O_3$, $Y_2O_3$, $Fe_2O_3$, $Cr_2O_3$, $In_2O_3$, and mixtures thereof.

14. The method of claim 1, wherein the glass ceramic comprises 1-20 wt.-% of an oxide being selected from a group consisting of $Ta_2O_5$, $Nb_2O_5$, $V_2O_5$, $P_2O_5$, and mixtures thereof.

15. The method of claim 1, wherein the glass ceramic comprises 1-5 wt.-% of an oxide being selected from a group consisting of $TiO_2$, $HfO_2$, $SnO_2$, and mixtures thereof.

16. The method of claim 1, wherein the glass ceramic comprises 1-10 wt.-% of at least of an oxide being selected from a group consisting of RO, ZnO, and mixtures thereof, wherein R is an alkaline earth ion.

17. A method of producing a glass ceramic comprising a garnet-like main crystal phase, wherein the garnet-like main crystal phase has the chemical formula: $Li_{7+x-y}M_x^{II}M_{3-x}^{III}M_{2-y}^{IV}M_y^{V}O_{12}$, wherein $M^{II}$ is a bivalent cation, $M^{III}$ is a trivalent cation, $M^{IV}$ is a tetravalent cation, $M^{V}$ is a pentavalent cation, the method comprising the steps of:
- providing starting materials for the glass ceramic;
- melting and homogenizing the starting materials to yield a glass melt;
- cooling the glass melt and temperature treating to generate the glass ceramic comprising the garnet-like main crystal phase with an amorphous proportion of at least 5% wt.-%.

18. The method of claim 1, wherein $0 \leq x \leq 2$ and $0 \leq y \leq 1$.

19. The method of claim 1, wherein the amorphous proportion has a maximum of 40 wt.-%.

20. A method of producing a glass ceramic comprising a garnet-like main crystal phase, wherein the garnet-like main crystal phase has the chemical formula $Li_{7+x-y}M_x^{II}M_{3-x}^{III}M_{2-y}^{IV}M_y^{V}O_{12}$, wherein $M^{II}$ is a bivalent cation, $M^{III}$ is a trivalent cation, $M^{IV}$ is a tetravalent cation, $M^{V}$ is a pentavalent cation, the method comprising the steps of:
- providing starting materials for the glass ceramic;
- melting and homogenizing the starting materials to yield a glass melt;
- cooling the glass melt and temperature treating to generate the glass ceramic comprising the garnet-like main crystal phase with an amorphous proportion of at least 5% wt.-% and an ion-conductivity of at least $5 \cdot 10^{-5}$ S/cm.

\* \* \* \* \*